C. C. ROBERTS.
FRUIT-BASKET.
No. 186,759. Patented Jan. 30, 1877.
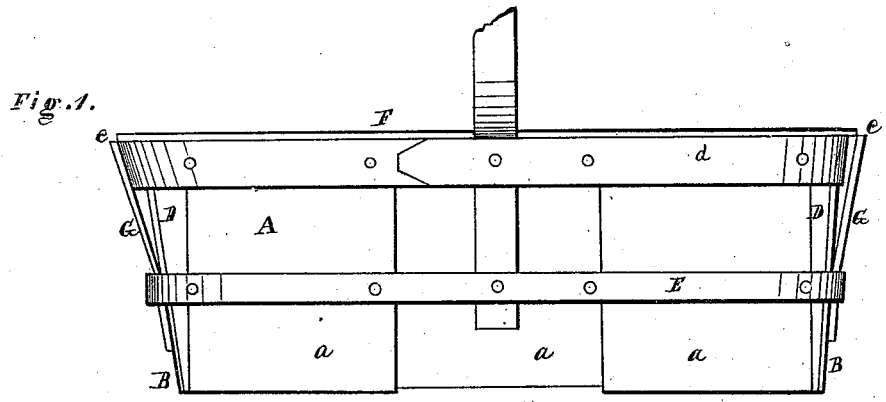
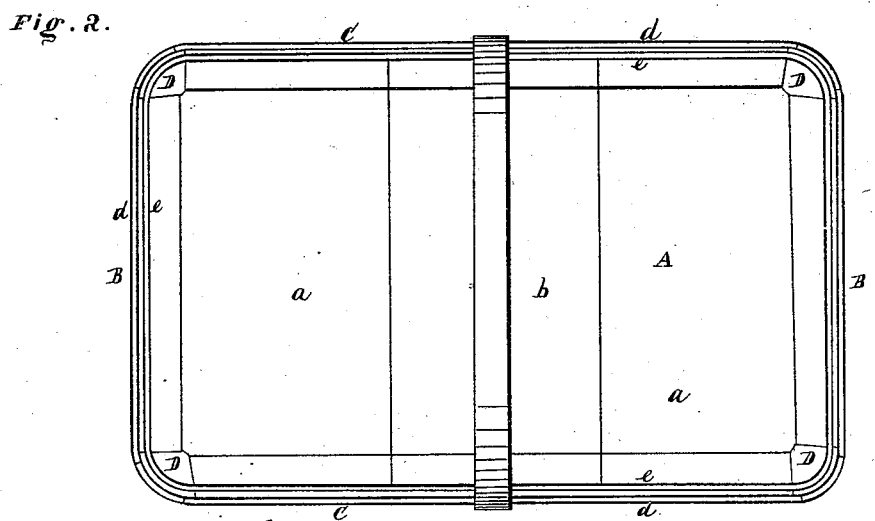
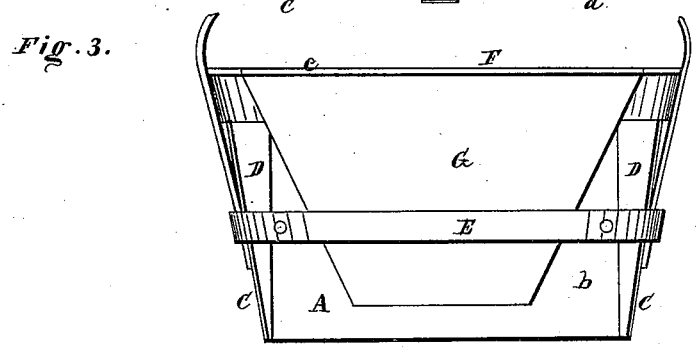
Witnesses. Inventor.

UNITED STATES PATENT OFFICE.

CHARLES C. ROBERTS, OF CLEVELAND, OHIO, ASSIGNOR TO MYRON DOW, OF SAME PLACE.

IMPROVEMENT IN FRUIT-BASKETS.

Specification forming part of Letters Patent No. 186,759, dated January 30, 1877; application filed October 12, 1876.

*To all whom it may concern:*

Be it known that I, CHARLES C. ROBERTS, of Cleveland, in the county of Cuyahoga and State of Ohio, have invented new and useful Improvements in Fruit-Baskets, of which the following is a description, reference being had to the accompanying drawings, making a part of this specification, in which—

Figure 1 is a side view of the basket, having thereon the cover. Fig. 2 is a top view without the cover. Fig. 3 is an end view having the cover thereon.

Like letters of reference refer to like parts in the several views.

The objection to splint baskets with vertical sides is, that they cannot be nested—that is to say, one basket cannot be inserted in another, or partially so, for convenience of transportation, as the tapering-sided ones can be. Therefore, to avoid this objectionable feature of the vertical-sided basket is one of the purposes of this invention; and a splint basket having tapering sides and ends is, therefore, provided, as will be seen at A, Fig. 1, which represents a side view of a basket, the ends B of which are slanting inwardly toward the bottom. The sides, also, are slanting, as will be seen at C in Fig. 2. Lengthwise and transversely the rim of the basket is straight, as will be seen in Fig. 2, which represents a top view of a basket without a cover. Said basket is made up of transverse splints $a$ and longitudinal splint $b$.

The splints may be more or less in number, according to the size of the basket or the width of the splints.

The V-shaped openings at the corners, caused by the spreading or flaring shape of the basket, are closed by a gore, D, the upper ends of which are embraced by the bands $d\ e$, forming the rim of the basket. The lower part of the gores are tacked or otherwise secured to the band F.

It will be obvious that in making the ends of the basket straight, as will be seen in Fig. 2, at B, the cover F can be bent squarely and closely over the edge.

The straight incisions $c$, Fig. 1, made across the cover to cause the bend for the tucks G, will coincide with the ends of the basket, and fit closely thereto, as shown in the drawings, Figs. 1 and 3, in which it will be seen that the tucks are bent over the ends of the basket and inserted behind the band E for security.

In shipping these baskets, the covers are removed and put up in packs, to accompany the baskets to which they respectively belong.

The baskets are nested by inserting the end of one into another, forming a circular nesting of baskets, which cannot be done with the ordinary covered splint baskets, for the reason that the top and bottom of such are of the same size.

As aforesaid, this basket is made up of transverse splints $a$, and a longitudinal one, $b$. The splint $b$, as will be seen in the drawings, is covered at the ends of the basket by the transverse splints, thus making the bottom of the basket at each end of double thickness, thereby adding to the strength and durability of the same.

The gores in the corners are made to lap onto the sides and ends of the basket. As the basket may shrink in drying, the material is worked up while wet. The corners will remain close and not leak, as in ordinary splint baskets they are liable to do.

I am aware that baskets with tapering sides and ends have been made. I am also aware that splint baskets with straight or vertical sides and ends, have been made and in use, and provided with tuck covers, neither of which do I claim; but in my invention the basket has tapering ends and sides, with the edges or rims of the ends formed in straight lines, for the purpose of fitting thereto a cover with the laps or tucks thereof inserted in loops at the ends of said basket.

What I claim as my invention, and desire to secure by Letters Patent, is—

The basket A, provided with a band, E, and having tapering sides and ends, the rim or edge of said ends being formed in straight lines, in combination with the tucked cover F, substantially as and for the purpose set forth.

CHARLES C. ROBERTS.

Witnesses:
 J. H. BURRIDGE,
 A. KELLEY.